Dec. 19, 1967 R. S. CANTRELL 3,358,833

CENTRIFUGAL SEPARATOR

Filed April 23, 1965

INVENTOR.
RONALD S. CANTRELL

BY
*Jerome P. Bloom*
ATTORNEYS

United States Patent Office 3,358,833
Patented Dec. 19, 1967

3,358,833
CENTRIFUGAL SEPARATOR
Ronald S. Cantrell, Hamilton County, Tenn., assignor to The Bauer Bros. Co., Springfield, Ohio, a corporation of Ohio
Filed Apr. 23, 1965, Ser. No. 450,301
8 Claims. (Cl. 209—211)

This invention relates to centrifugal separators and more particularly to hydrocyclones for separating a fluid suspension of solids into dirt poor and dirt rich fractions. It will be described in reference to a conical type separator and as utilized for pulp refining. However, this should not be construed as limiting the character of its embodiment or the nature of its application.

A hydrocyclone for pulp refining provides a separating chamber having an underflow and an overflow nozzle, relatively aligned and at respectively opposite ends. It includes an inlet for admitting a fluid suspension of solids adjacent its overflow nozzle to move inwardly thereof in a pressured, swirling flow and in a sense tangential to the chamber wall. The pattern of forces produced by this swirling inflow of material is relatively complex. As the suspension, under pressure, swirls from one end of the chamber to the other, its flow is characterized by decreasing pressure from the chamber wall to its central axis. On the other hand, the angular velocity of its flow increases in a sense inwardly from the chamber wall to approach a constant about its central axis. A pressure differential occurs, producing a movement of suspension fluid and lighter fibers in the direction of the aforementioned central axis. In contrast heavier fibers and solids in the suspension tend to move outwardly, under the influence of centrifugal force, towards the chamber wall. Further, in moving from the inlet of the separating chamber towards its opposite end which includes the underflow nozzle, the fluid suspension achieves a high rotative speed causing it to separate into concentric layers and to produce a liquid-free center core. The layers flow in opposite directions and the center core provides a passageway for exit of suspension contained air, the latter of which is sheared from the fibers in the swirling flow. An outer layer is generally designated as an outer vortex and an inner layer the inner vortex. The inner vortex picks up light, dirt poor, relatively clean fibers which move radially inward of the chamber and evacuates them with accompanying fluid through the overflow nozzle in a reverse flow. The outer layer which contains heavier dirt rich fibers and dirt particles per se exits through the underflow nozzle.

In this conventional separator there is a tendency for the swirling fibers suspended in their fluid vehicle to congregate and move in high density accumulations intermediate the chamber wall and its central axis. As a result of this a significant percentage of dirt rich fibers and heavy dirt particles, per se, are either caught up in the accumulations as they try to move outwardly to the chamber wall or bounce back into the inner vortex to be imprisoned in and to contaminate the dirt poor, relatively clean fraction moving to and through the overflow nozzle of the separator. The present invention obviates this problem.

A primary object of the invention is to provide improvements in centrifugal type separators rendering them not only economical to fabricate but more efficient and satisfactory in use, adaptable to a wide variety of applications and unlikely to malfunction.

Another object of the invention is to provide a centrifugal type separator with optimal cleaning efficiency.

A further object of the invention is to provide a centrifugal type separator with means disturbing its normal operating pattern in a manner to obviate the problem above described in reference to the use of conventional separators.

An additional object of the invention is to provide a hydrocyclone type separator possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 illustrates a longitudinal section of a hydrocyclone separator embodying the improvements of the present invention;

Like parts are indicated by similar characters of reference throughout the several views.

The drawings illustrate a hydrocyclonic cleaner device comprising a shell-like housing 10 including a frustoconical portion 11 and a cylindrical head or inlet portion 12.

Figure 1:
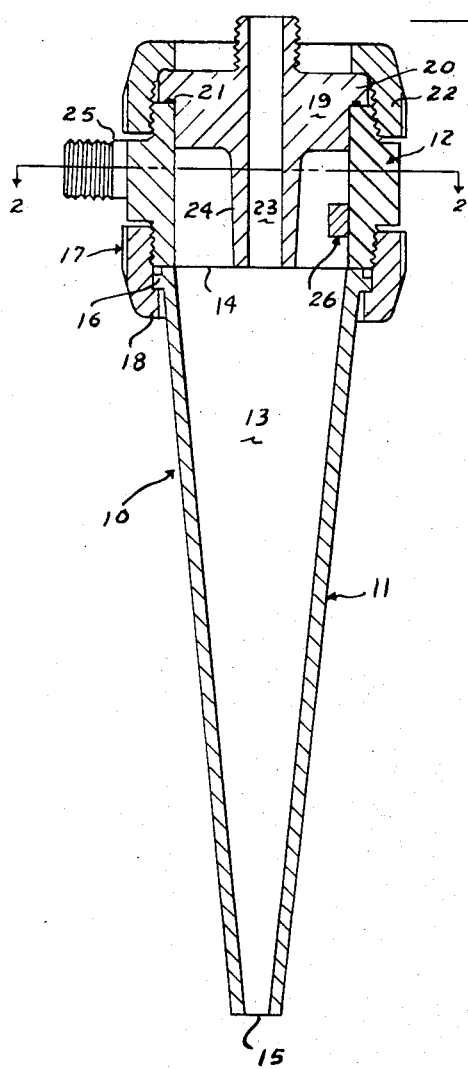
Figure 2:
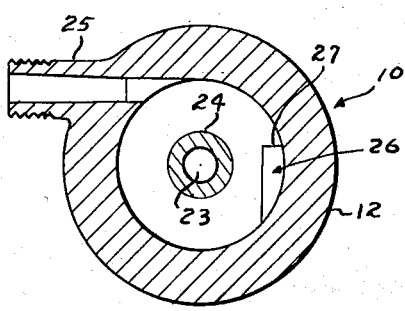
FIG. 2 is a cross-sectional view taken on line 2—2 of FIG. 1.
Figure 3:
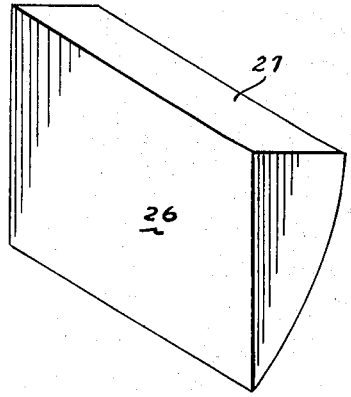
FIG. 3 is a perspective view of a flow obstructing element in the hydrocyclone of FIG. 1.

The portion 11 has the shape of a hollow relatively truncated cone and defines the form of a separating chamber 13. Its base extremity 14 is open and positioned uppermost, as seen in FIG. 1 of the drawings. Its apex is also open and forms an underflow nozzle 15. Adjacent and spaced from its base extremity, the portion 11 includes an external annular flange 16.

The head portion 12 is tubular and externally threaded at either end. Its radial dimension corresponds to that of the base of the housing portion 11. The one end of head 12 seats coextensively on the base end of the portion 11.

A nut 17 which slides over the apex end of the housing portion 11 has an internal flange 18 to one end which relatively abuts the undersurface of the flange 16, as seen in FIG. 1 of the drawings. The other end of the nut is internally threaded to threadedly engage the adjacent end of the head 12 and clamp it in fixed relation to the base of the portion 11.

Bridging the head 12 at its end remote from the portion 11 is a nozzle plate 19. The plate 19 has a boss portion which nests in the upper end of the head 12 as its outer peripheral portion 20 seats to the upper extremity of the head. A seal 21 is interposed between the plate portion 20 and the head. The nozzle plate is fixed in the position just described by a nut 22 one end of which is threadedly engaged about the upper end of the head and the other end of which includes an internal flange overlying the plate portion 20 and clamping it to the head.

A central opening 23 in the nozzle plate 19 is defined by a tubular nozzle 24 a portion of which projects inwardly of the head to terminate in the plane of the head base. The nozzle 24 is projected to the other side of the plate 19 where it is externally threaded for connection to a suitable discharge conduit.

A laterally projected tubular boss 25 formed integral with the head 12 provides a decreasing inlet and forms a flow path opening to the head in a sense tangential to its inner wall. A ramp type obstruction 26 is fixed on the inner wall of the head. It includes a vertical face 27 projecting inwardly of and generally radial to the head wall in an opposed obstructing relation to a normal flow inwardly of the head.

In the embodiment illustrated, the ramp element is circularly displaced from the aforementioned inlet about 90° and disposed slightly below the plane of entry of the suspension as it is delivered through the separator inlet, tangential to the head wall. This enables the flow which has imposed thereon an initial accelerating influence in moving through the inlet, immediately prior to reaching the ramp surface 27, to impact on the ramp with some force.

In function of the preferred embodiment of the invention above described, as related to a pulp refining procedure, a liquid suspension of solids in the form of a pulp slurry is directed inwardly of the head under a high pressure. In entrance of this slurry in a sense tangential to the inner wall of the head it moves through the decreasing inlet in an initially accelerated manner and in a swirling path around and in a sense downwardly of the head to hit the obstruction provided by the radial face 27 of the ramp element 26. This impact on a surface transverse to the flow path occurs with sufficient force to produce a continuing turbulence in the incoming tangentially directed suspension. The continued swirling inflow of material is such to induce the advanced material, on which turbulence has been imposed, to swirl at high speed, about the overflow nozzle and down into the conical chamber 13. As is prevalent in conical separators of the type described, the flow achieves a layered effect throughout the chamber 13. An outer vortex moves to the underflow nozzle and a reversely directed inner vortex forms about an essentially liquid free central core to move towards the overflow nozzle. The turbulence as induced on entry is propagated throughout the suspension as it moves the length of the chamber 13.

A resultant side effect is an inherent disturbance of the fiber and solids content of the slurry inhibiting their gathering to create concentrations of high density as they respectively dispose themselves, according to specific gravity, in the inner or outer vortex. This leaves a relatively free path for fast and effective movement of foreign particles and objectionable size and weight fiber bundles to the inner wall of the separator body portion 11. This insures that the accepts or dirt poor fraction of the suspension constituted by the relatively light clean fibers which reach the inner vortex remain relatively free of any objectionable particles which would contaminate the end product. By the same token the dirt particles and undesirable foreign bodies as well as the heavy objectionable fiber bundles are permitted to move rapidly out to the wall of the chamber 13 and are thereby expedited in their delivery to and through the underflow nozzle 15.

Here, in the preferred embodiment of the invention illustrated, the impact surface transverse to the flow path has been interposed slightly below the plane of inflow to the head of the separator so that the pressured inflow will achieve a degree of angular velocity immediately prior to impact. As a result, on impact with the obstruction provided by the surface 27 of element 26 there is produced a degree of flow turbulence that it reflects in the materials within the separator as they move throughout the length of the chamber 13.

Thus, the embodiment provides for an obstruction transverse to the path of an accelerated pressured inflow of a pulp slurry to produce a turbulence therein prior to its actual entry to the cyclone separating chamber portion 13 in a manner to propagate the effect of the turbulence, the net result of which is a cleaner and more desirable end product being delivered through the overflow nozzle of the separator.

The above described embodiment of the invention refers to a particularly advantageous angular and axial displacement of the impact surface 27 referenced to the material inlet. However, the position of surface 27 need not be so precisely limited, provided it remains an obstructing surface in the head portion generally transverse to the flow of materials swirling inwardly of the body 10.

Tests in use of the described embodiment show the achievement of a remarkable reduction in pressure drop across the cleaner for a given throughput, as contrasted to use of the cleaner in absence of the invention improvements. For example in testing the cleaner in absence of improvements, with a normal throughput of 90 g.p.m. the pressure drop is 40 p.s.i. With the improvements of the invention the same throughput has been achieved with a pressure drop of only 22 p.s.i. There is also shown to be an increase in separating efficiency.

Tests have generally indicated the invention also enables the greatest possible savings in power for pumping a device of the type described.

It should be obvious that the invention may be applied to a hydrocyclone having a form other than that illustrated. Moreover, it should be equally obvious, that the surface 27 may be produced on the inner wall of the head portion of a separator by various means without departing from the spirit or scope of the present invention.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a centrifugal separator for dividing a liquid suspension of solids into dirt poor and dirt rich fractions, including a hollow body of circular cross-sectional interior forming underflow and overflow outlets at its opposite ends and having an entrance portion near said overflow outlet, closure means for one end of said hollow body including said overflow outlet, tubular means defining said overflow outlet and projecting inwardly of said body on the axis thereof, there being an inlet in said entrance portion for tangential inflow of the liquid suspension, the liquid suspension progressing in swirling motion in said hollow body, initially about said tubular means and progressing toward said underflow outlet, a dirt poor fraction separating and moving in a reverse sense longitudinally of the body to said overflow outlet; the improvement residing in a ramp type obstruction located in the entrance portion of the hollow body at the wall thereof encountered by the inflowing suspension and creating a disturbance to flow causing turbulence substantially throughout the length of said hollow body along the wall thereof, said obstruction presenting an impact surface of longitudinal extent terminating at its opposite ends within the extremities of said tubular means for limited impact with extended turbulence.

2. A centrifugal separator according to claim 1, characterized in that said obstruction is located to be displaced in a longitudinal sense from said inlet, one end of said impact surface being in a plane transverse to the axis of said hollow body adjacent to the transverse plane of said inlet.

3. A centrifugal separator according to claim 1, characterized in that said obstruction presents a contoured surface to fit against and conform to the interior wall of said body, said contoured surface terminating at one end in said impact surface, said obstruction being oriented to align said impact surface to face in a direction directly counter to the inflowing fluid suspension.

4. In a centrifugal separator for dividing a liquid suspension of solids into dirt poor and dirt rich fractions, including a hollow body comprised of a frusto-conical section and a cylindrical section, the latter being relatively short in length and constituting an extension of the base end of said frusto-conical section, a closure for the end of said cylindrical section remote from said frusto-conical section, a nozzle being installed in said closure to dispose axially of said frusto-conical section to serve as the overflow outlet, the apex end of said frusto-conical section being aligned with the nozzle to serve as the underflow outlet, there being a lateral inlet in said cylindrical section for tangential inflow of the liquid suspension to swirl inwardly thereof about said nozzle, said frusto-conical section forming a separating chamber receiving flowing liquid suspension from said cylindrical section and wherein the dirt rich fraction joins an outer vortex and discharges through said underflow apex outlet while the dirt poor fraction joins an inner vortex and discharges oppositely through said overflow nozzle outlet; the improvement residing in an obstruction located in said cylindrical section at the wall thereof presenting an impact surface of longitudinal extent facing counter to the direction of inflowing suspension to disturb such flow in a limited area in said cylindrical section, an effective turbulence being created thereby extending into and substantially throughout the length of said separating chamber for improved separating efficiency and lower pressure drop, the longitudinal extent of said impact surface being within said cylindrical section intermediate the ends of said nozzle.

5. A centrifugal separator according to claim 4, characterized in that said obstruction is displaced from said inlet to locate said impact surface approximately 90° distant from said inlet in a circumferential sense and in an adjacent plane in a longitudinal sense toward said apex.

6. A hydrocyclone separator for dividing a liquid suspension of solids into dirt poor and dirt rich fractions comprising a hollow body defining a separating chamber including a head portion closing one end thereof, means defining an overflow nozzle mounting centrally of said head portion and projecting inwardly thereof to open to said chamber on the axis thereof, means defining an underflow nozzle opening from said chamber at the opposite end thereof, means defining an inlet in said head portion for directing a liquid suspension of solids to flow inwardly thereof in a sense tangential to its inner wall surface and under such pressure to swirl about said overflow nozzle and be driven thereby inwardly of said separating chamber in a manner to inherently form concentric layers having reversed directions of flow, the inner layer flowing to exit through said overflow nozzle and the outer to exit through said underflow nozzle said head portion being characterized by means fixed to project radially inward of its inner wall surface intermediate the extremities of the inwardly projecting portion of said overflow nozzle, said means including a limited surface area thereof in transversely disposed obstructing relation to the tangentially directed inflow of said suspension which impacts thereon to produce a turbulence therein, which turbulence is reflected in the swirling suspension as it moves thereafter into and through said separating chamber and is operative to inhibit high density accumulations of solids in localized portions of said separating chamber.

7. A centrifugal separator for dividing a liquid suspension of solids into dirt poor and dirt rich fractions comprising a hollow body forming a chamber of generally conical form having at the apex portion thereof means defining a small orifice for discharge of dirt rich fractions and at the base thereof closure means, said closure means including inwardly projecting tubular means defining a nozzle for discharge of dirt poor fractions, and an inlet for delivering a pressured flow of a liquid suspension in a sense tangentially to the inner wall surface of said hollow body to swirl about said nozzle and be driven thereby inwardly of said chamber towards its apex, in a manner to inherently form concentric layers having reversed directions of flow, an inner layer flowing to exit through said nozzle and an outer to exit through said apex orifice, characterized by said closure means having in connection therewith tubular means forming a cylindrical extension of said conical chamber, said tubular means having formed therein said inlet, and means defining a limited projection from said tubular means in a limited area of said cylindrical extension intermediate the ends of said nozzle to provide an obstructing rim including an impact surface generally transverse to the inflowing suspension as it moves about said nozzle in the direction of said chamber, producing thereby a momentary agitating influence in said suspension which is reflected therein as it moves to and through the conical chamber.

8. A separator as set forth in claim 7 characterized by said impact surface being adjacent and having a circular displacement from said inlet in the neighborhood of 90°, providing thereby that said impact surface is in the direct circular line of flow as said suspension moves inwardly of said hollow body from said inlet.

References Cited

UNITED STATES PATENTS

| | | | |
|---|---|---|---|
| 940,076 | 11/1909 | Seaver | 209—144 |
| 997,171 | 7/1911 | Zehfus | 55—426 |
| 2,731,147 | 1/1956 | Krebs | 209—211 |
| 2,735,547 | 2/1956 | Vissac | 209—211 |
| 2,776,053 | 1/1957 | Krebs | 209—211 |
| 2,929,501 | 3/1960 | Fenske | 209—144 |
| 3,098,036 | 7/1963 | Neumann | 209—144 |

FOREIGN PATENTS

| | | |
|---|---|---|
| 1,146,338 | 3/1963 | Germany. |

FRANK W. LUTTER, *Primary Examiner.*